(No Model.) 2 Sheets—Sheet 1.

W. BOWERS.
PIPE COUPLING.

No. 442,947. Patented Dec. 16, 1890.

WITNESSES:
Oscar A. Michel.
E. L. Sherman

INVENTOR
William Bowers,
BY Drake & Co. ATTY'S.

(No Model.) 2 Sheets—Sheet 2.

W. BOWERS.
PIPE COUPLING.

No. 442,947. Patented Dec. 16, 1890.

WITNESSES: INVENTOR

Oscar H. Michel.
E. L. Sherman.

William Bowers,
BY Drake & Co. ATTY'S.

UNITED STATES PATENT OFFICE.

WILLIAM BOWERS, OF NEW YORK, N. Y., ASSIGNOR TO SARAH E. BOWERS, OF SAME PLACE.

PIPE-COUPLING.

SPECIFICATION forming part of Letters Patent No. 442,947, dated December 16, 1890.

Application filed November 26, 1889. Serial No. 331,648. (No model.)

*To all whom it may concern:*

Be it known that I, WILLIAM BOWERS, a citizen of the United States, residing at New York, in the county of New York and State of New York, have invented certain new and useful Improvements in Joints and Packings for Pipe Fittings and Connections; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a joint or coupling for gas and other pipes simple in construction, convenient to adjust, and efficient in operation, and combining a packing therewith also easy to adjust and efficient in action.

The invention consists in the improved joint and packing and in the combination and arrangement of the several parts thereof, as hereinafter set forth, and finally pointed out in the claims.

Figure 1:
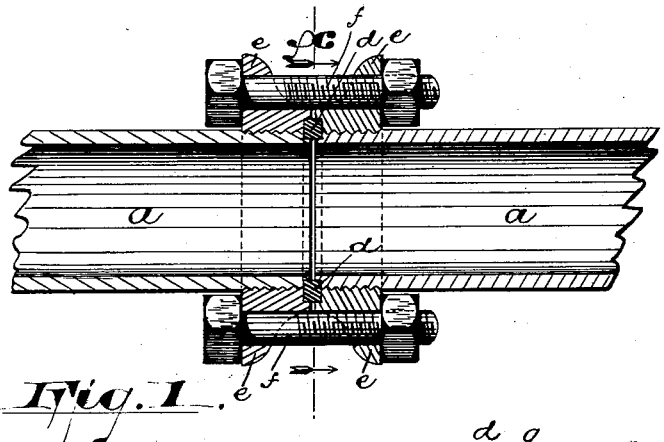
Figure 2:
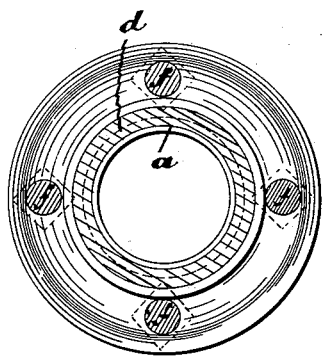
Figure 3:
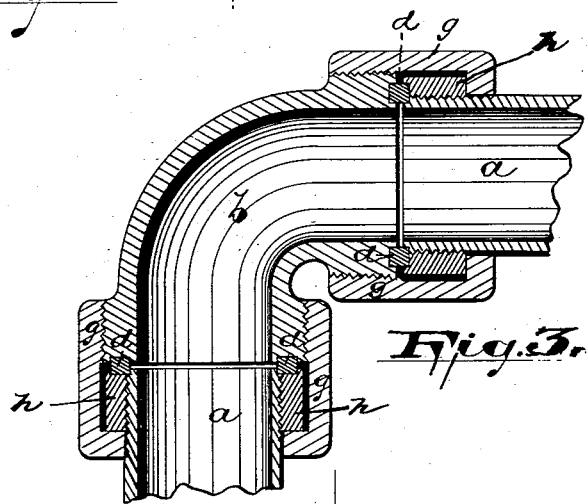
Figure 4:
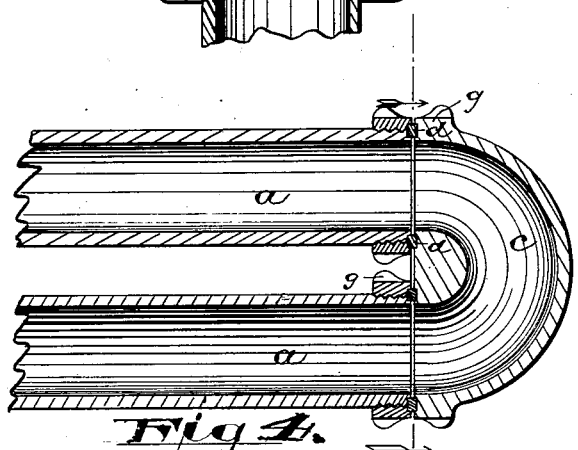
Figure 5:
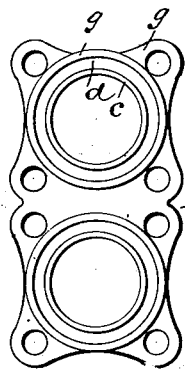
Figure 6:
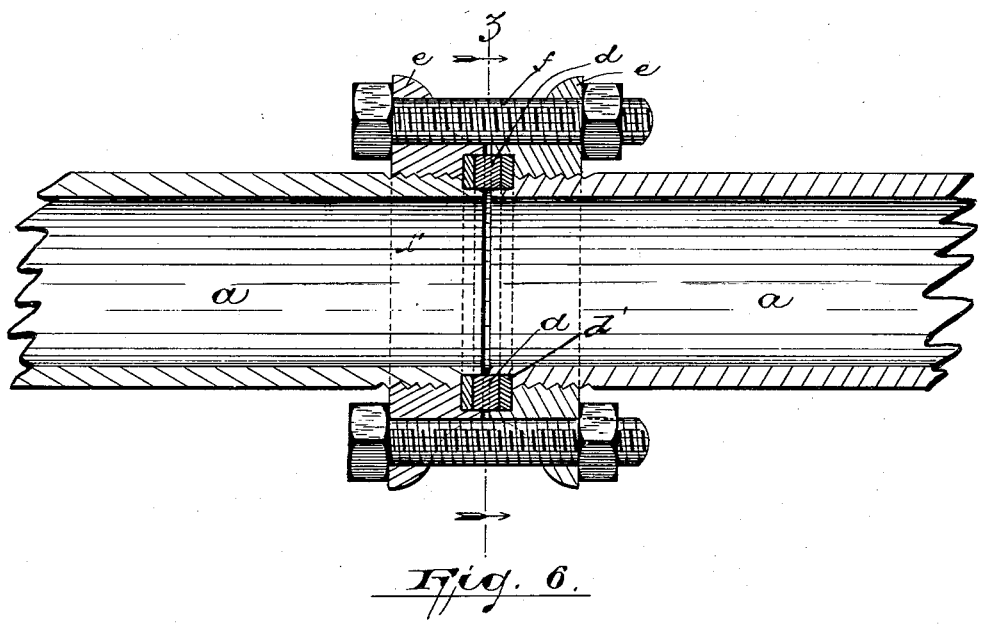
Figure 7:
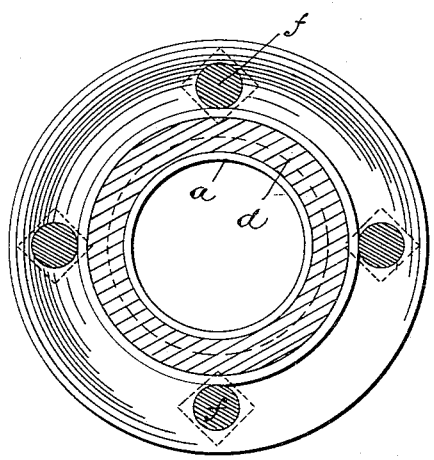

Referring to said drawings, Figure 1 represents a central longitudinal section through a pipe, showing my improved joint and packing in connection therewith. Fig. 2 is a vertical transverse section through line $x\ x$ of Fig. 1. Fig. 3 represents a central longitudinal section through two pipes connected by an elbow, showing my improved joint and packing in connection therewith in a modified form. Fig. 4 is a central longitudinal section through two pipes connected by a return-bend, showing the joint and packing. Fig. 5 is a vertical transverse section through line $y\ y$ of Fig. 4. Fig. 6 is a view similar to that of Fig. 1, showing a modified form of the packing; and Fig. 7 is a section through line $z\ z$ of Fig. 6.

Similar letters of reference indicate like parts wherever they occur.

In said drawings, $a$ indicates an ordinary pipe, $b$ an elbow, and $c$ a return-bend. Upon the ends of the straight pipes, except in Fig. 3, are screwed flanged rings $e$, flush with ends of said pipe. In the end faces thus formed are rabbets cut partly into the pipes and partly into the rings, in which is inserted a metal packing-ring $d$ or rings $d\ d'$, as seen in Fig. 6. The packing $d$ or $d$ and $d'$ being placed in position, the ends of the pipe $a$ are brought into juxtaposition, and are then firmly bound together by the bolts $f\ f$, thus compressing the packing and forming tight joints both between the ends of the pipes and between the pipes and the rings $e$.

In Figs. 3 and 4 I have shown a modification of my device, in which is a ring $h$ without any flange, in which case the bolts are dispensed with, the packing being compressed by a sleeve or union $g$, which is screwed upon the enlarged ends of the elbow inclosing said rings $h$ and firmly binds the packing in its seat as the union is screwed home, as will be understood.

This pipe-joint, while intended to be used for steam and all kinds of gas pipes, is especially effective when used upon pipes for refrigerating purposes.

The joint is made by first screwing the rings on the ends of the pipes, as shown, and then recessing or rabbeting each of the adjoining ends, said grooves extending on both sides of the threaded joint, leaving enough metal next to the inside of the pipe to make a guard for the packing and extending inward sufficiently far to give sufficient strength to the packing used to resist whatever pressure may be required.

The packing may be made of lead, as indicated in the figures, or of lead and a harder metal, as iron or steel, as indicated in Fig. 6, in which the center rings $d$ represent the hard metal and the outer rings $d'$ the soft metal. The packing being made in the form of rings or washers to fit the aforesaid recesses, said rings will also serve to aid in keeping the connecting-pipes concentric. It will be observed that the packing, as herein shown, stops leakage between the threads of the screwed parts of the joint, as well as between the adjacent ends of the pipes, and does away with all soldering, thereby effecting a great saving in this respect, and not only so, but in respect to packing and transportation, wherein the parts may be packed and shipped separately instead of being joined and screwed together, as this can be done as effectively where they are to be used as where they are to be made.

The packing may be round, oval, or angular in cross-section without departing from the spirit of the invention, the main object being to place it so as to cover and protect all the joints. In some cases I prefer to use the lead rings alone, as indicated in Figs. 1, 2, 3, 4, and 5, and in others the lead and a harder metal combined, as indicated in Figs. 6 and 7, according to the circumstances of the case.

Having thus described my invention, what I claim is—

1. A pipe-coupling consisting of the pipes having the rabbets in their ends forming an annular channel, the clamp having the rabbets in its inner walls in line with the rabbets of the pipes, thus forming an annular open channel between the ends of the pipes and the clamp, and a packing in said channel between the clamp and pipes.

2. In a pipe-coupling, the combination, with the pipes of different external diameters having their ends threaded, of the ring clamped between the ends of the pipe, the ring engaging the smaller pipe and clamping said ring, and the union or sleeve having one end engaging the large end and the other end engaging the clamping-ring.

In testimony that I claim the foregoing I have hereunto set my hand this 13th day of November, 1889.

WILLIAM BOWERS.

Witnesses:
CHARLES H. PELL,
E. L. SHERMAN.